United States Patent
Wuerstlein et al.

(10) Patent No.: US 8,212,513 B2
(45) Date of Patent: Jul. 3, 2012

(54) METHOD AND DEVICE FOR DETECTING THE ROTATION OF A BRUSH-OPERATED D.C. MOTOR

(75) Inventors: Holger Wuerstlein, Zeil am Main (DE); Wolf-Christian Mueller, Coburg (DE); Wolfgang Uebel, Weitramsdorf (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 93 days.

(21) Appl. No.: 12/564,668

(22) Filed: Sep. 22, 2009

(65) Prior Publication Data

US 2010/0072933 A1 Mar. 25, 2010

Related U.S. Application Data

(63) Continuation of application No. PCT/EP2008/001475, filed on Feb. 25, 2008.

(30) Foreign Application Priority Data

Mar. 22, 2007 (DE) .......................... 10 2007 013 711

(51) Int. Cl.
*H01R 39/42* (2006.01)
(52) U.S. Cl. .......... 318/542; 318/139; 318/721; 318/738
(58) Field of Classification Search .................. 318/538, 318/541, 542, 560, 650, 652, 127, 139, 400.32, 318/701, 721, 784, 814, 823, 735, 736, 794, 318/799, 817, 292, 490, 514, 533, 738, 779; 322/53, 92, 98, 76, 95, 96; 310/148, 151, 310/248; 323/203; 388/836, 928
See application file for complete search history.

(56) References Cited

U.S. PATENT DOCUMENTS

| | | | |
|---|---|---|---|
| 1,912,995 A | 6/1933 | Osnos | |
| 2,260,589 A | 10/1941 | Smith | |
| 3,662,240 A * | 5/1972 | Yukisada et al. | 388/816 |
| 3,818,343 A | 6/1974 | Galli et al. | |
| 4,218,640 A | 8/1980 | Vialatte | |
| 4,249,120 A * | 2/1981 | Earle | 318/729 |
| 4,758,770 A * | 7/1988 | Manueco Santurtun et al. | 318/666 |
| 5,432,421 A * | 7/1995 | Kessler et al. | 318/538 |
| 6,222,331 B1 * | 4/2001 | Blum | 388/809 |
| 6,628,893 B2 * | 9/2003 | Ohno et al. | 388/800 |
| 6,759,820 B2 * | 7/2004 | Karwath | 318/400.23 |

(Continued)

FOREIGN PATENT DOCUMENTS

DE    1 145 367    10/1963

(Continued)

*Primary Examiner* — Walter Benson
*Assistant Examiner* — Antony M Paul
(74) *Attorney, Agent, or Firm* — Muncy, Geissler, Olds & Lowe, GmbH

(57) ABSTRACT a method and a device for detecting the rotation of a brush-operated d.c. motor comprising a number of winding branches which are electrically connected between brushes, during the operation of the motor, by means of plates, according to the rotational angle. According to the invention, an alternating voltage signal is modulated on the basis of a supply direct voltage for the brushes, by which means the course of the complex resistance of the direct current motor is determined and used for the detection of rotation. In this way, the invention enables a cost-effective rotation detection that can be used in motor vehicle technology without requiring additional mechanical components.

22 Claims, 2 Drawing Sheets

U.S. PATENT DOCUMENTS

| | | | |
|---|---|---|---|
| 7,034,499 B2 * | 4/2006 | Kerlin et al. | 318/749 |
| 7,345,471 B2 * | 3/2008 | Sellen et al. | 324/207.12 |
| 7,791,303 B2 * | 9/2010 | Furman | 318/541 |
| 2004/0098213 A1 | 5/2004 | Gerlach | |
| 2005/0149292 A1 | 7/2005 | Busch | |
| 2007/0013331 A1 | 1/2007 | Kalb | |
| 2009/0174354 A1 * | 7/2009 | Knezevic et al. | 318/400.32 |

FOREIGN PATENT DOCUMENTS

| | | |
|---|---|---|
| DE | 2235 176 | 2/1973 |
| DE | 28 40 348 A1 | 3/1979 |
| DE | 195 03 484 C1 | 2/1996 |
| DE | 42 11 982 B4 | 9/2006 |
| DE | 10 2005 018 526 A1 | 10/2006 |
| DE | 20 2005 011 333 U1 | 12/2006 |

* cited by examiner

METHOD AND DEVICE FOR DETECTING THE ROTATION OF A BRUSH-OPERATED D.C. MOTOR

This nonprovisional application is a continuation of International Application No. PCT/EP2008/001475, which was filed on Feb. 25, 2008 and which claims priority to German Patent Application No. 10 2007 013 711.9, which was filed in Germany on Mar. 22, 2007, and which are both herein incorporated by reference.

BACKGROUND OF THE INVENTION

1. Field of the Invention

The invention relates to a method and a device for detecting the rotation of a brush-operated d.c. motor comprising a number of winding branches which are electrically connected between brushes during operation, with the aid of plates, according to the rotation angle.

2. Description of the Background Art

A brush-operated d.c. motor is frequently used to electrically drive an actuator of a motor vehicle, for example an electrically operable window pane, an electrically operable sunroof, an electrically operable hatch or an electrically adjustable vehicle seat, since such a motor is sturdy and relatively economical to manufacture.

In principle, a brush-operated d.c. motor includes a rotor, also referred to as a rotor coil or armature, which rotates relative to a stator, also referred to as a stator coil. To generate the torque, a d.c. motor of this type usually includes winding branches which are assigned to the rotor coil, are connectable to a direct current source and rotate in an energizing field of the stator. The energizing field may be generated either by a permanent magnet or, in turn, by current-carrying windings on the stator. In the latter case, a distinction is made between a series-wound motor and a shunt-wound motor, depending on whether the stator windings are connected in series or in parallel, relative to the winding branches of the rotor. To maintain the direction of rotation, the polarity of the current flowing through the winding branches of the rotor must be continuously reversed during rotation. This is done using a so-called commutator, which has a plate carrier that is non-rotationally connected to the rotor and rotates relative to the brushes connected to the direct voltage source. A number of plates, which are insulated against each other and are alternately contacted by the brushes during rotor rotation, are distributed over the circumference of the plate carrier. In each case, one winding branch is usually connected between two plates.

The revolutions of the d.c. motor or of a drive shaft assigned thereto are ordinarily detected to control or regulate motion and to detect the present position of an actuator driven by the d.c. motor. In particular, a position of the actuator must be determined on the basis of the detected revolutions if an anti-trap control is to be implemented for the driven actuator. After all, the actuator position may be used to ascertain whether the actuator is located in a danger zone upon dropping below a minimum gap size. The distance covered by the actuator, and therefore its position, is ascertained on the basis of the number of revolutions completed. A rotational speed may also be ascertained from the number of revolutions per time unit.

So-called Hall sensors are commonly used today in automotive engineering to detect the rotational speed or determine position. For this purpose a two-pole or multipole ring magnet is non-rotationally disposed on a drive axis and the periodic changes in the magnetic field resulting therefrom during one rotational motion are detected, using the Hall effect with the aid of a suitable sensor, namely a Hall sensor, and conclusions about the rotational speed or a position of an actuating element are drawn therefrom. However, the provision of a ring magnet assigned to the drive motor is disadvantageously associated with unwanted additional costs.

Optical systems are also know for detecting the rotational speed. However, optical systems cannot be used in automotive engineering, in particular in the installation area of the drive motor, since they are highly susceptible to dirt.

SUMMARY OF THE INVENTION

It is therefore an object of the present invention to provide a method for detecting a rotation signal of a brush-operated d.c. motor, which is as cost-effective as possible and may be used in automotive engineering. An object of the invention is also to provide a corresponding device for carrying out the method.

The first object mentioned is achieved according to the invention by a method for detecting the rotation of a brush-operated d.c. motor comprising a number of winding branches which are electrically connected between brushes during operation, with the aid of plates, depending on the rotation angle, an alternating voltage signal being modulated on the basis of a supply direct voltage for the brushes, by which means the course of the complex resistance of the d.c. motor is ascertained and used to detect the rotation.

The invention is based on the idea that the winding branches of the d.c. motor already have complex resistances that are not identical per se. This is due to mechanical winding differences resulting in differences in the particular inductivity and parasitic capacitance values. Since the winding branches come into periodic electrical contact with the brushes via the plates during a rotational motion of the d.c. motor, this results in a periodic change in the complex resistance of the d.c. motor. This periodic change in the complex resistance may then be detected by measurement by modulating an alternating voltage signal on the basis of the supply direct voltage. The course of the complex resistance may then be ascertained and used to detect the rotation via the alternating voltage signal. Modulating the alternating voltage signal always produces a reactive power in the d.c. motor.

The periodic change in the complex resistance may be ascertained, for example, as a change in the phase angle, amplitude or frequency of the alternating voltage signal picked up via the d.c. motor. For measurement purposes, the d.c. motor is connectable, for example, to a measuring bridge having an ohmic resistor, and the alternating voltage picked up at the ohmic resistor is compared with a reference signal with regard to its phase or its amplitude. Alternatively, the change in complex resistance is also detectable by detuning a resonant circuit, the d.c. motor being connected by circuitry means to the resonant circuit. It is also possible to determine a frequency change in the picked up signal with the aid of a phase-locked-loop circuit and a regulated oscillator and to draw conclusions about the course of the complex resistance therefrom.

The periodic change in the complex resistance of the d.c. motor may be detected either by the winding branches of the rotor connecting diametrically opposed plates to each other, which then lie between the brushes, or by the winding branches connecting adjacent plates to each other. In the first case, the individual winding branches, and thus their complex resistance, are each sampled separately during one rotation. In the second case, the current flows constantly through all windings independently of the rotation angle. However, a periodic change in the complex resistance results from the fact that, when a brush passes the gap between two adjacent plates, the brush bridges these plates, and the winding branch connected therebetween is short-circuited thereby. The periodic removal of the winding branches during bridging of two plates, in turn, results in a periodically changing course of the complex resistance, which may be evaluated by circuitry means for the purpose of detecting the rotation.

In an embodiment, an electronic component connected to at least one plate is used to amplify the rotation angle-dependent variation of the complex resistance. Due to this component, the detected complex resistance resulting during contacting of the corresponding plate is selectively changed, facilitating detection by measurement. For example, an ohmic resistor, an inductor or a capacitor is conceivable as the electronic component. To avoid power loss in the d.c. motor, the ohmic resistance should be higher than the real resistance of the winding branches, but lower than the alternating current or complex resistance dependent on the frequency of the alternating voltage signal. This is easy to implement if a high-frequency signal in the MHz range is used as the alternating voltage signal. The complex resistance of an inductor used as the additional electronic component should also be less than or equal to the inductance of the winding branches.

In an embodiment, an electronic component connected between the plate and the armature of the d.c. motor is used to amplify the rotation angle-dependent variation of the complex resistance. This makes use of the fact that the armature of the d.c. motor is connected to ground. If the plate connected to the armature via the electronic component is contacted by a brush carrying a potential other than ground, the complex resistance corresponding to the electronic component is detectable. For example, if a capacitor is used as the electronic component, the coupled alternating voltage signal is short-circuited to ground during contacting of the corresponding plate, which is easy to detect by measurement. If a plate is provided with the additional electronic component, a metrologically significant variation of the complex resistance results for each revolution. In general, multiple plates may also be provided, which increases the resolution.

In a further embodiment, an electronic component connected between two plates may be used for amplification. This induces a desired, significant complex resistance in the connection between two plates. This complex resistance may then be picked up or detected periodically when the brushes bridge the two plates.

An electronic component connected between two plates which are contacted simultaneously by brushes of different polarity can be used for amplification. In this embodiment, the alternating voltage signal does not follow the current path via the winding branches, but rather the current path via the electronic component connecting the plates, if the brushes contact both interconnected plates. In the case of two brushes, a significant change in the complex resistance is detectable twice with each revolution. A revolution is thus detected by two measuring points. As mentioned above, the electronic component used may therefore be, for example, an ohmic resistor whose resistance is less than the frequency-dependent complex resistance of the inductors of the winding branches. A correspondingly selected inductor is also conceivable. However, a capacitor is advantageously used as an employed electronic component, since it does not produce any power loss in case of the direct voltage signal driving the motor.

In coupling the alternating voltage signal, it is advisable to capacitively couple the signal to the supply direct voltage. This safely decouples the supply direct voltage from the alternating voltage generator. It is advisable to use frequencies in the megahertz range as the frequency of the alternating voltage signal in order to influence the power of the d.c. motor as little as possible when using electronic components to amplify the periodic change in the complex resistance.

The course of the complex resistance is suitably detected as a change in a phase or an amplitude of a measured signal compared to a reference signal. This variant is advisable, in particular, in order to generate a digital useful signal which may be easily further processed by a control unit, for example by providing a threshold value.

To generate a digital useful signal it is advantageous, in turn, to detect the change in the measured signal with the aid of an operational amplifier and to route the output signal of the operational amplifier via a bandpass filter for the purpose of forming a useful signal.

The alternating voltage signal itself may be easily derived by circuitry means from the clock frequency of a microcontroller through division without providing additional components, if such microcontroller is already part of a control circuit or the like.

The second object mentioned is achieved according to the invention by a rotation detecting device comprising a d.c. motor which includes a number of brushes, a rotor and a number of winding branches assigned to the rotor, which are electrically connectable between the brushes during operation via plates, depending on the rotation angle, comprising a voltage source connected to the brushes for generating a supply direct voltage modulated by an alternating voltage signal, comprising a measured value pick-up on the d.c. motor for detecting the complex resistance of the d.c. motor, and comprising a control unit connected to the measured signal pick-up for carrying out the method described above.

In an embodiment, the control unit is connected to the voltage generator for driving the d.c. motor. The control unit then ascertains the revolutions per time unit from the detected course of the complex resistance and may adjust it to a preset setpoint speed by controlling the voltage generator.

Since the complex resistance of the d.c. motor is detected via an alternating voltage signal modulated on the basis of the supply direct voltage for the purpose of detecting rotation, no additional lines are needed for the connection between the control unit and d.c. motor. In contrast to previously known approaches, in which a separate sensor was required both for supply and for evaluating additional lines between the control unit and d.c. motor, the invention is therefore recommended for embodiments in which the control unit is to be situated at a distance from the drive unit.

To couple the alternating voltage signal to the supply direct voltage, the voltage source advantageously includes a direct current source and an alternating voltage generator, an output of the alternating current generator being coupled by circuitry means to an output of the direct voltage source via a capacitor.

To use the measured signal, it is advisable to provide an evaluation circuit in the control unit, which is configured for detecting the course of the complex resistance as a change in a phase or an amplitude of a measured signal compared to a reference signal.

Further advantages are derived from the subordinate claims directed to a device. The advantages described with regard to the method also apply in the same manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
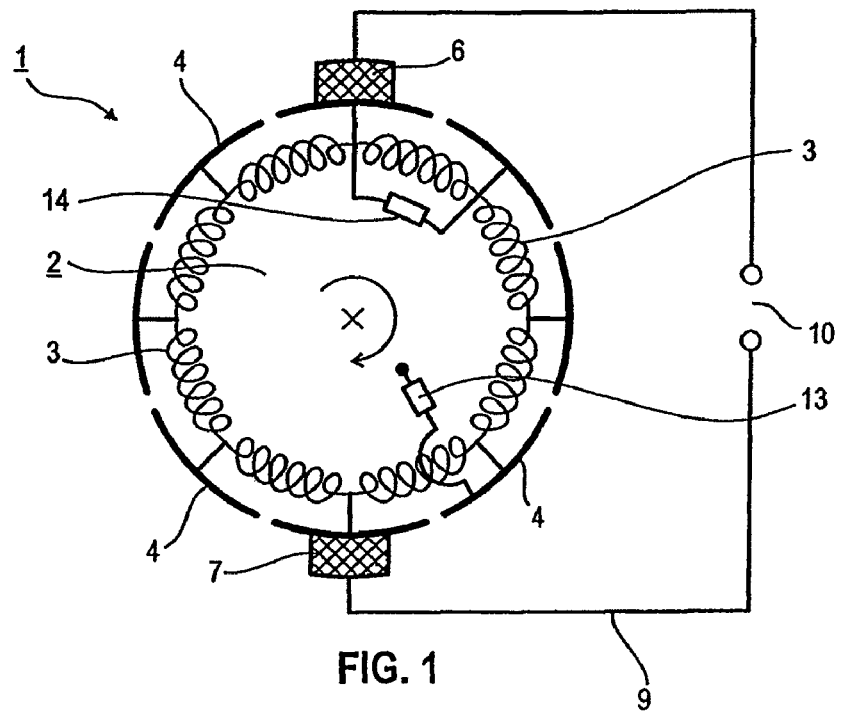
FIG. 1 shows a schematic representation of the winding branches and the plates of a rotor of a d.c. motor, an additional electronic component being connected to selected plates.

FIG. 1 shows a schematic illustration of the power supply to a rotor 2 of a brush-operated d.c. motor 1. Rotor 2 is disposed in the energizing field of a stator, which is not shown. To produce a torque, rotor 2 includes a number of winding branches 3, each of which is connected between plates 4 disposed in the circumferential direction. Brushes 6 and 7 are pressed onto the plate carrier carrying plates 4 for the purpose of electrical contacting. Brushes 6 and 7 are connected to a voltage source 10 via supply lines 9.

Voltage source 10 generates a supply direct voltage relative to ground in such a way that brush 6 is set to a potential other than ground and brush 7 is set to the ground potential. Upon application of the supply direct voltage, rotor 2 executes a rotary motion in the direction of the centrally illustrated rotation arrow as a result of the rotation angle-dependent contacting of plates 4 by brushes 6 and 7 and as a result of the corresponding mechanical winding of the individual winding branches. An H-bridge relay, or a semiconductor drive circuit, which reverses the direct voltage poles in such a way that the direction of rotation is reversible, is not illustrated. All winding branches 3 are continuously current-conducting, except in a state in which two plates are bridged by the brush.

FIG. 1 shows two alternative embodiments for modifying illustrated d.c. motor 1 with regard to easy detection of rotation by circuitry means. According to the first alternative, an additional electronic component 13 is connected between a plate 4 and the armature or rotor 2 of d.c. motor 1. Since armature 2 of d.c. motor 1 is set to ground, a complex resistance which is modified over the other plates is detected whenever correspondingly equipped plate 4 is contacted by brush 6. This complex resistance corresponds to that of additional electronic component 13 connecting plate 4 and ground. Electronic component 13 is designed, in particular, as a capacitor. In principle, however, a correspondingly suitable ohmic resistor may also be used, which has a lower inductance $i\omega L$ at the preset frequency that do remaining winding branches 3, with regard to the alternating voltage signal used.

According to the illustrated second alternative, two adjacent plates are electrically connected to each other via another additional electronic component 14. In the illustrated position of d.c. motor 1, diametrically opposed plates 4 are electrically contacted over their entire surfaces by brushes 6 and 7. The complex resistance therefore has the same value during contacting of particular plates 4, regardless of the particular rotation angle. However, if two adjacent plates 4 are bridged by brushes 6 and 7, the corresponding winding branch connecting bridged plates 4 are removed from the current path. If the complex resistance of one or more winding branches 3 differs from that of the other winding branches 3, a periodic change in the complex resistance corresponding to the rotational speed is detectable at the particular bridging position. The significant change in the complex resistance is hereby detectable twice per revolution, namely upon bridging by brush 6 and upon bridging by brush 7. To increase the resolution, multiple plates 4 may also be connected via additional electronic components. In principle, it is also conceivable for an additional electronic component to be connected in parallel to each winding branch 3, so that a complete series connection of electronic components is produced. In principle, it is also possible to detect the direction of rotation itself in this manner.

Figure 2:
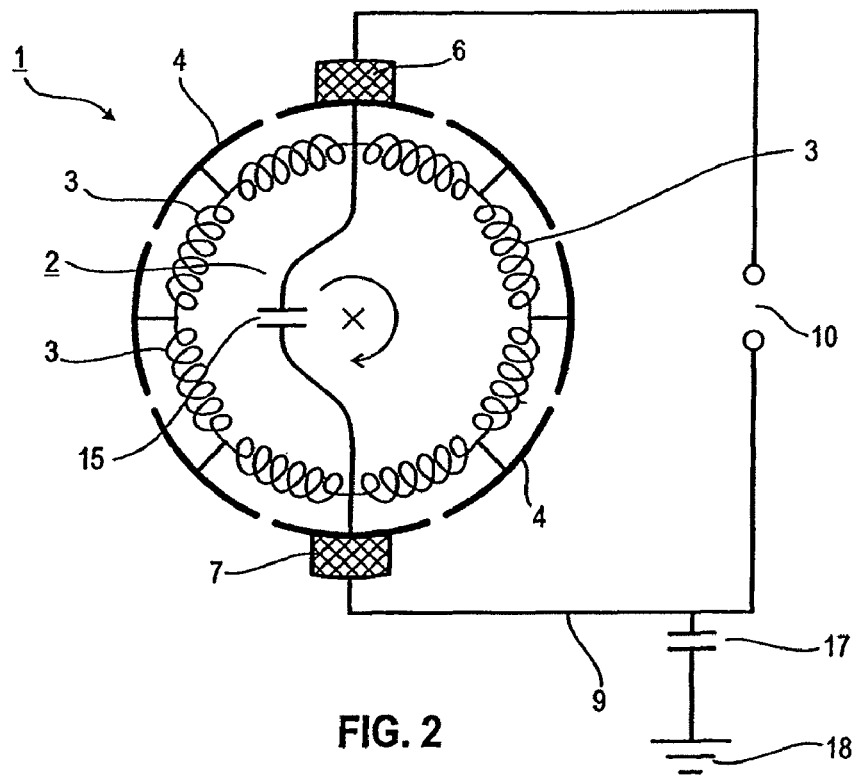
FIG. 2 shows a schematic representation of the winding branches and the plates of a rotor of a d.c. motor, an additional electronic component being inserted between two diametrically opposed plates.

FIG. 2 shows a further alternative embodiment of a modification of a d.c. motor 1 with regard to easy detection of rotation. As shown in FIG. 1 above, illustrated d.c. motor 1 includes a rotor 2 onto which are mounted winding branches 3 which are contactable with the aid of plates 4. Winding branches 3 are electrically contacted with the aid of brushes 6 and 7, which are supplied by a voltage source 10.

In contrast to d.c. motor 1 according to FIG. 1, according to FIG. 2 two diametrically opposed plates 4, which are simultaneously contacted by brushes 6 and 7, are electrically connected to each other via a capacitor 15. Line 9 is also connected to ground 18 via a short-circuiting capacitor 17.

In the illustrated position, brush 6 is short-circuited with brush 7 for the alternating voltage signal via capacitor 15 and short-circuited to ground 18 via short-circuiting capacitor 17. In other words, the complex resistance of d.c. motor 1 measured in this position tends toward zero. This periodic significant change in the complex resistance, which recurs twice during one revolution, may be easily used to detect the rotation or to detect the rotational speed directly.

Figure 3:
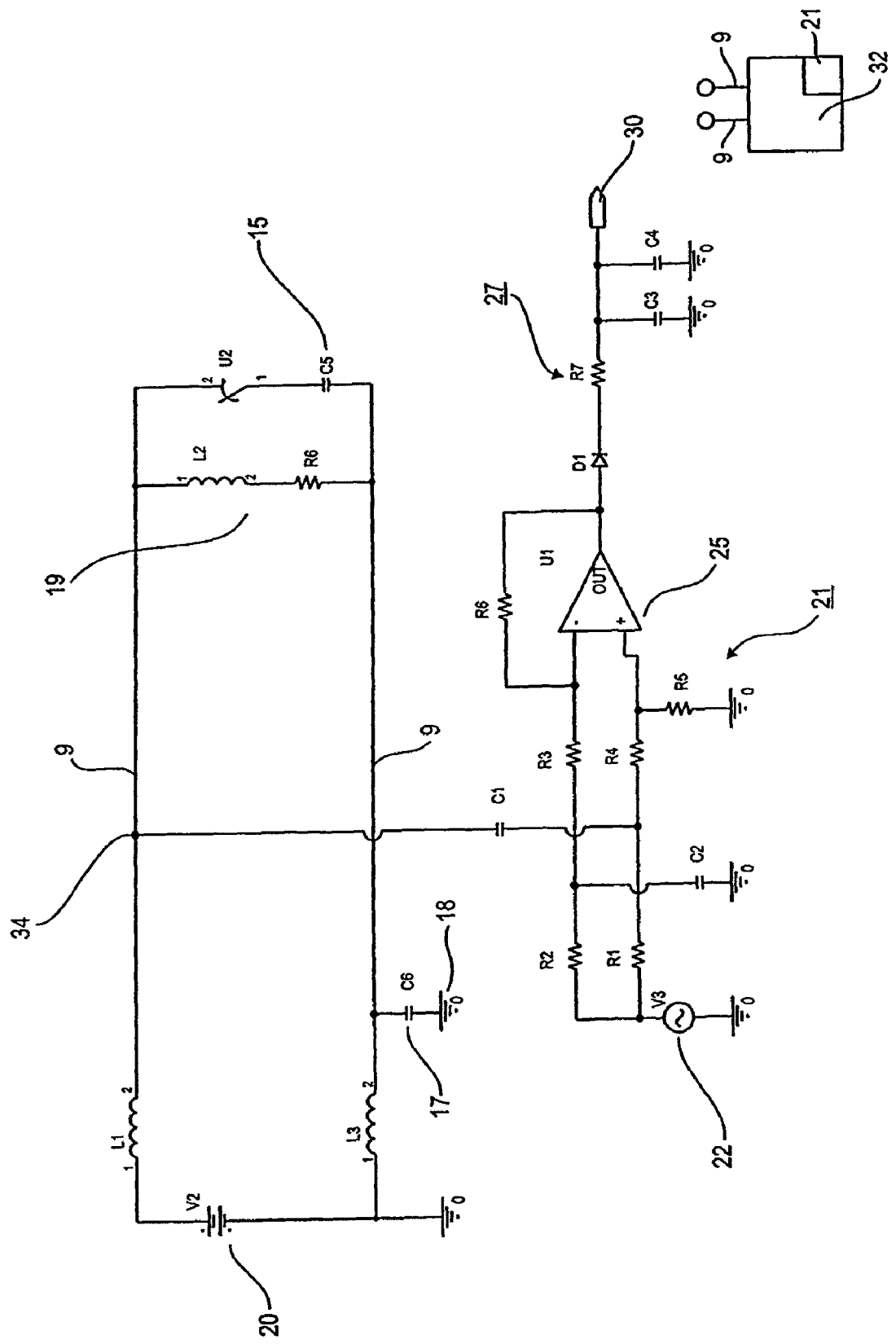
FIG. 3 shows a circuit diagram for detecting the course of the complex resistance during the rotary motion of a d.c. motor.

FIG. 3 shows a circuit diagram for a rotation detection of this type. A coil L2 and a resistor R6 are illustrated as an equivalent circuit diagram of the d.c. motor according to FIG. 2. The inductance of coil L2 and ohmic resistance R6 represent the electrical properties of the winding branches. Capacitor 15, identified by C5 in FIG. 3, is shown, which periodically bridges the winding branches of the d.c. motor. This is illustrated schematically by switch U2.

A supply direct voltage is supplied to the d.c. motor itself via a direct power source 20, identified as V2, over supply lines 9. Inductance coils L1 and L3, which are otherwise customarily integrated into the d.c. motor, are mounted on the side of a control unit (see 32) and prevent an alternating voltage signal modulated on the basis of the supply direct voltage from being undesirably short-circuited via the input circuit of the control unit. An unwanted short-circuit of this type may take place by connection to ground via relays or by interference-suppression capacitors at the supply voltage. Capacitor C6 or 17 short-circuits a modulated alternating voltage signal to ground 18.

To modulate a high-frequency alternating voltage signal, an alternating voltage generator 22 is also provided, which generates an alternating voltage having an amplitude of 1V and a frequency of 5 MHz (Megahertz). The high-frequency alternating voltage is capacitively modulated on the basis of the supply direct voltage via capacitor C1.

When the rotor of the d.c. motor enters the position shown in FIG. 2, which corresponds to a closed switch U2, the modulated alternating voltage signal is short-circuited to ground 18 via capacitor 15 and short-circuiting capacitor 17.

A useful signal 30, which is suitable for detecting the rotational speed, is generated via evaluation circuit 21, which includes an operational amplifier 25 and a peak detector 27. For this purpose, the measured signal is connected to the positive input of operational amplifier 25, and a reference signal is coupled to the negative input thereof, the negative input being fed back to the output in order to achieve an amplification factor. Finally, a square-wave signal, which is suitable as useful signal 30 for detecting the rotational speed, is formed from the output signal via peak detector 27.

Evaluation circuit 21 is part of a control unit 32, which drives the d.c. motor over supply lines 9, using a supply direct voltage on the basis of which an alternating voltage signal is modulated. According to the circuit diagram, evaluation unit 21 in this case is connected to one of supply lines 9 for evaluation by measured signal pick-up 34.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a rotation of a brush-operated d.c. motor, the method comprising:
providing a plurality of winding branches that are electrically connected between brushes during an operation via plates and based on a rotation angle; and
modulating a supply direct voltage for the brushes with an alternating voltage via which periodic removal of the winding branches during bridging of two plates results in a periodically changing course of the complex resistance, wherein the course of a complex resistance of the d.c. motor is ascertained and used for the detection of rotation.

2. The method according to claim 1, wherein the alternating voltage signal is capacitively coupled to the supply direct voltage.

3. The method according to claim 1, wherein the alternating voltage signal is derived from the clock frequency of a microcontroller through division.

4. A method for detecting a rotation of a brush-operated d.c. motor, the method comprising:
providing a plurality of winding branches that are electrically connected between brushes during an operation via plates and based on a rotation angle; and
modulating a supply direct voltage for the brushes with an alternating voltage via which a course of a complex resistance of the d.c. motor is ascertained and used for the detection of rotation, wherein an electronic component, which is connected to at least one plate, is used to amplify a rotation angle-dependent variation of the complex resistance.

5. The method according to claim 4, wherein the electronic component, which is connected between the plate and an armature of the d.c. motor, is used for amplification.

6. The method according to claim 4, wherein the electronic component, which is connected between two plates, is used for amplification.

7. The method according to claim 6, wherein an electronic component connected between two plates, which are contacted substantially simultaneously by brushes of different polarity, is used for amplification.

8. The method according to claim 4, wherein a capacitor is used as the electronic component.

9. A method for detecting a rotation of a brush-operated d.c. motor, the method comprising:
providing a plurality of winding branches that are electrically connected between brushes during an operation via plates and based on a rotation angle; and
modulating a supply direct voltage for the brushes with an alternating voltage via which a course of a complex resistance of the d.c. motor is ascertained and used for the detection of rotation, wherein the course of the complex resistance is detected as a change in a phase or an amplitude of a measured signal compared to a reference signal.

10. The method according to claim 9, wherein the change in the measured signal is detected by an operational amplifier and routed via a bandpass filter on an output side to form a useful signal.

11. A rotation detection device comprising:
a d.c. motor, which includes a plurality of brushes, a rotor, and a plurality of winding branches assigned to the rotor, the winding branches being electrically connectable between the brushes during an operation via plates based on a rotation angle;
a voltage source connectable to the brushes and configured to generate a supply direct voltage modulated by an alternating voltage signal;
a measured value pick-up configured to detect a complex resistance of the d.c. motor; and
a control unit connectable to the measured value pick-up for ascertaining a course of the complex resistance of the d.c. motor and used for the detection of rotation.

12. The device according to claim 11, wherein the control unit is connected to the voltage source for driving the d.c. motor.

13. The device according to claim 11, wherein the control unit and the d.c. motor are designed as separate components which are connected to each other via lines and are situated at a distance apart.

14. The device according to claim 11, wherein an additional electronic component, which is connected to at least one plate of the d.c. motor, is used to amplify a rotation angle-dependent variation of the complex resistance.

15. The device according to claim 14, wherein the electronic component is connected between the plate and an armature of the d.c. motor.

16. The device according to claim 14, wherein the electronic component is connected between two plates.

17. The device according to claim 16, wherein the electronic component is connected between two plates that are substantially simultaneously contactable by two brushes of different polarity.

18. The device according to claim 11, wherein the electronic component is a capacitor.

19. The device according to claim 11, wherein the voltage source includes a direct current source and an alternating voltage generator, an output of the alternating voltage generator being coupled by circuitry to an output of the direct voltage source via a capacitor.

20. The device according to claim 19, wherein the alternating current generator includes a microcontroller and a frequency divider which is configured to divide the clock frequency of the microcontroller.

21. The device according to claim 11, wherein the control unit includes an evaluation circuit that is configured to detect the course of the complex resistance as a change in a phase or an amplitude of a measured signal compared to a reference signal.

22. The device according to claim 21, wherein the evaluation circuit includes an operational amplifier for detecting the change, to which the measured signal and the reference signal are connected on an input side and which is connected by circuitry to a bandpass filter on an output side for forming a useful signal.

* * * * *